United States Patent
Lin

(10) Patent No.: US 12,163,618 B2
(45) Date of Patent: Dec. 10, 2024

(54) TABLET HOLDER

(71) Applicant: Chien-Ting Lin, Santa Fe Springs, CA (US)

(72) Inventor: Chien-Ting Lin, Santa Fe Springs, CA (US)

(73) Assignee: Chien-Ting Lin, Santa Fe Springs, CA (US)

( * ) Notice: Subject to any disclaimer, the term of this patent is extended or adjusted under 35 U.S.C. 154(b) by 0 days.

(21) Appl. No.: 17/677,997

(22) Filed: Feb. 22, 2022

(65) Prior Publication Data

US 2023/0263280 A1  Aug. 24, 2023

(51) Int. Cl.
*F16M 11/04* (2006.01)
*A45C 11/00* (2006.01)

(52) U.S. Cl.
CPC .......... *F16M 11/041* (2013.01); *A45C 11/00* (2013.01); *A45C 2011/003* (2013.01)

(58) Field of Classification Search
CPC . F16M 11/041; A45C 11/00; A45C 2011/003; F16B 2/12
See application file for complete search history.

(56) References Cited

U.S. PATENT DOCUMENTS

| | | | | |
|---|---|---|---|---|
| 5,903,645 A * | 5/1999 | Tsay | ................... | B60R 11/0241 248/316.4 |
| 7,418,097 B2 * | 8/2008 | Chang | ................... | H04M 1/06 379/450 |
| 7,828,259 B2 * | 11/2010 | Wang | ................. | F16M 11/2021 248/316.4 |
| 9,103,487 B2 * | 8/2015 | Hale | ...................... | H04M 1/12 |
| 9,420,712 B2 * | 8/2016 | Yang | .................... | H05K 5/0204 |
| 9,586,530 B2 * | 3/2017 | Kim | ..................... | F16M 13/022 |
| 9,776,577 B2 * | 10/2017 | Carnevali | ............ | F16M 11/041 |
| 10,118,565 B2 * | 11/2018 | Kim | ........................ | B60R 11/02 |
| 10,172,246 B2 * | 1/2019 | Apter | ................... | F16M 13/022 |
| 10,207,652 B2 * | 2/2019 | Yu | ......................... | F16M 11/041 |
| 10,533,699 B2 * | 1/2020 | Yang | ..................... | H04B 1/3877 |
| 10,598,199 B1 * | 3/2020 | Fan | ...................... | F16M 13/022 |
| 10,626,899 B2 * | 4/2020 | Lien | ......................... | H04M 1/11 |
| 11,075,664 B2 * | 7/2021 | Lin | ......................... | H04M 1/04 |
| 11,424,782 B2 * | 8/2022 | Lin | ....................... | F16M 11/041 |
| 2007/0262223 A1 * | 11/2007 | Wang | .................. | B60R 11/0241 248/346.07 |
| 2015/0028170 A1 * | 1/2015 | Fan | ........................... | F16B 2/12 248/176.3 |

(Continued)

*Primary Examiner* — Eret C McNichols

(57) ABSTRACT

Provided is a tablet holder for clamping a tablet, including: a first U-groove coupling part provided with a first opening and a first accommodating portion, wherein the first U-groove coupling part is provided with a first clamping portion at one end and a first coupling opening at another end; a second U-groove coupling part provided with a second opening and a second accommodating portion, wherein the second U-groove coupling part is provided with a second clamping portion at one end and provided with a second coupling opening at another end; and a positioning member. The tablet is placed in a clamping space formed between the first clamping portion and the second clamping portion, the second U-groove coupling part and the first U-groove coupling part can slide relative to each other, and thus the tablet can be firmly clamped in the clamping space by an action of the positioning member.

6 Claims, 24 Drawing Sheets

(56) References Cited

U.S. PATENT DOCUMENTS

| | | | |
|---|---|---|---|
| 2015/0192155 A1* | 7/2015 | Chen | F16M 11/38 |
| | | | 348/376 |
| 2015/0359114 A1* | 12/2015 | Yang | F16B 2/12 |
| | | | 248/161 |
| 2017/0350555 A1* | 12/2017 | Jertson | F16M 11/16 |
| 2018/0266457 A1* | 9/2018 | Du | F16B 2/12 |
| 2019/0260865 A1* | 8/2019 | Yang | F16M 13/022 |

* cited by examiner

TABLET HOLDER

BACKGROUND OF THE INVENTION

1. Field of the Invention

The present invention relates to a tablet holder, and more particularly, to a tablet holder without redundant parts.

2. The Prior Arts

Conventional tablet holders have two L-shaped members including an upper L-shaped member and a lower L-shaped member. Their transversal portions are an upper clamping portion and a lower clamping portion, respectively. Their longitudinal portions are an upper coupling portion and a lower coupling portion, respectively. The upper coupling portion and the lower coupling portion are coupled with each other into a C-shaped tablet holder. A compression spring, a back plate, a rear cover plate, and screw(s) are disposed between the upper coupling portion and the lower coupling portion. When in use, a side of the tablet is placed at the lower clamping portion, the upper clamping portion is pulled open and another side of the tablet is placed thereto, and then the upper clamping portion is released, such that the upper clamping portion and the lower clamping portion are close to each other to clamp the tablet.

In addition, conventional X-shaped tablet holders even use complicated parts, such as a large number of screws and nuts, which make the structure complicated.

These tablet holders have the disadvantages that there are a larger number of parts, the structure is complicated, and the maintenance is more difficult.

SUMMARY OF THE INVENTION

In order to solve the problem caused by the complicated parts of the conventional tablet holders, the present invention provides a tablet holder comprising: a first U-groove coupling part provided with a first clamping portion and a second U-groove coupling part provided with a second clamping portion, wherein the first U-groove coupling part and the second U-groove coupling portion are coupled with each other, a clamping space is formed between the first clamping portion and the second clamping portion, and the clamping space can be adjusted to an appropriate size through a positioning member, thereby clamping the tablet. The present invention is convenient in use. In addition to being used to clamp tablets, the present invention can also be used to clamp thin objects, such as mobile phones.

The technical solution of solving the above-mentioned problems in the present invention is to provide a tablet holder for clamping a tablet, comprising: a first U-groove coupling part longitudinally provided with a first opening, wherein both sides of the first opening are longitudinally inwardly provided with a corresponding blocking portion at a predetermined position, respectively, an inwardly recessed portion of the first U-groove coupling part is a first accommodating portion communicated with the first opening, the first U-groove coupling part is provided with a first clamping portion at one end thereof and a first coupling opening at another end thereof; a second U-groove coupling part longitudinally provided with a second opening, wherein an inwardly recessed portion of the second U-groove coupling part is a second accommodating portion communicated with the second opening, the second U-groove coupling part is provided with a second clamping portion at one end thereof and a second coupling opening at another end thereof; and a positioning member. In assembling, the first clamping portion is placed correspondingly to the second clamping portion, the second coupling opening penetrates into the first coupling opening, the second U-groove coupling part is restricted by the blocking portion, in such a way that the first U-groove coupling part and the second U-groove coupling part are fitted with each other, a clamping space is formed between the first clamping portion and the second clamping portion, and thus the tablet can be placed in the clamping space, and the second U-groove coupling part and the first U-groove coupling part can slide longitudinally with respect to each other, thereby holding the tablet in the clamping space by an action of the positioning member.

Preferably, the positioning member is a first spring, the second accommodating portion is longitudinally provided with a first spring wall and a second spring wall, a first spring groove is formed between the first spring wall and the second spring wall, a first limit stop is provided at a predetermined position of the first coupling opening of the first U-groove coupling part, a second limit stop is provided at a predetermined position of the second coupling opening of the second U-groove coupling part, the first limit stop and the second limit stop are provided at both ends of the first spring groove, respectively. The first spring is placed into the first spring groove, and both ends of the first spring abut against the first limit stop and the second limit stop, respectively. In operating, the clamping space is adjusted to be larger, the tablet is placed therein, and then the first spring abuts against the first limit stop and the second limit stop, such that the first clamping portion and the second clamping portion are close to each other to clamp the tablet.

Preferably, two sides of the first U-groove coupling part adjacent to the first opening are defined as a first sidewall and a second sidewall, respectively, two sides of the second U-groove coupling part adjacent to the second opening are defined as a third sidewall and a fourth sidewall, respectively. The positioning member includes a second spring and a third spring. The third sidewall and the fourth sidewall are shifted inwardly toward the second accommodating portion. In assembling, the first clamping portion is placed correspondingly to the second clamping portion, the second coupling opening penetrates into the first coupling opening, a second spring groove is formed between the first sidewall and the third sidewall, a third spring groove is formed between the second sidewall and the fourth sidewall, two third limit stops are provided at predetermined positions of the first coupling opening, two fourth limit stops are provided at predetermined positions of the second coupling opening, the third limit stops and the fourth limit stops are disposed at both ends of the second spring groove and the third spring groove, respectively. The second spring and the third spring are placed into the second spring groove and the third spring groove, respectively, and both ends of the second spring and the third spring abut against the third limit stops and the fourth limit stops, respectively. In operating, the clamping space is adjusted to be larger, the tablet is placed therein, and then the second spring and the third spring abut against the third limit stops and the fourth limit stops, such that the first clamping portion and the second clamping portion are close to each other to clamp the tablet.

Preferably, the positioning member is a first screw stud, the second clamping portion is provided with a through hole, and the through hole extends longitudinally inwardly from an outside of the second clamping portion to the second accommodating portion.

Preferably, the first accommodating portion is provided with a first nut at a predetermined position close to the first coupling opening, and the first screw stud penetrates through the through hole and the first nut, whereby a size of the clamping space can be adjusted by a releasing and a locking between the first screw stud and the first nut.

Preferably, the first accommodating portion is longitudinally provided with a fifth sidewall and a sixth sidewall, a movable fastening member is provided on the first screw stud, a second nut is provided at a center of the movable fastening member, one set of opposite sides of the movable fastening member are two partially corresponding parallel walls, and another set of opposite sides thereof are two corresponding arc walls; the clamping space is adjusted to a predetermined size; when the first screw stud is rotated in a locking direction, the arc walls of the movable fastening member abut against the fifth sidewall and the sixth sidewall, respectively, whereby the movable fastening member remains stationary, and the first screw stud and the second nut can be locked to each other; when the first screw stud is rotated in a releasing direction, the parallel walls of the movable fastening member can slide with respect to the fifth sidewall and the sixth sidewall, respectively.

The tablet holder of the present invention has the advantages of simple structure, not easy to failure, convenient to carry, and easy to operate. The present invention can be used to fix tablets, mobile phones, or thin rectangular equipments or objects.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Hereinafter, embodiments of the present invention according to FIGS. 1A to 8 will be described. This description is not intended to limit the embodiments of the present invention, but is any one of the embodiments of the present invention.

Figure 1A:
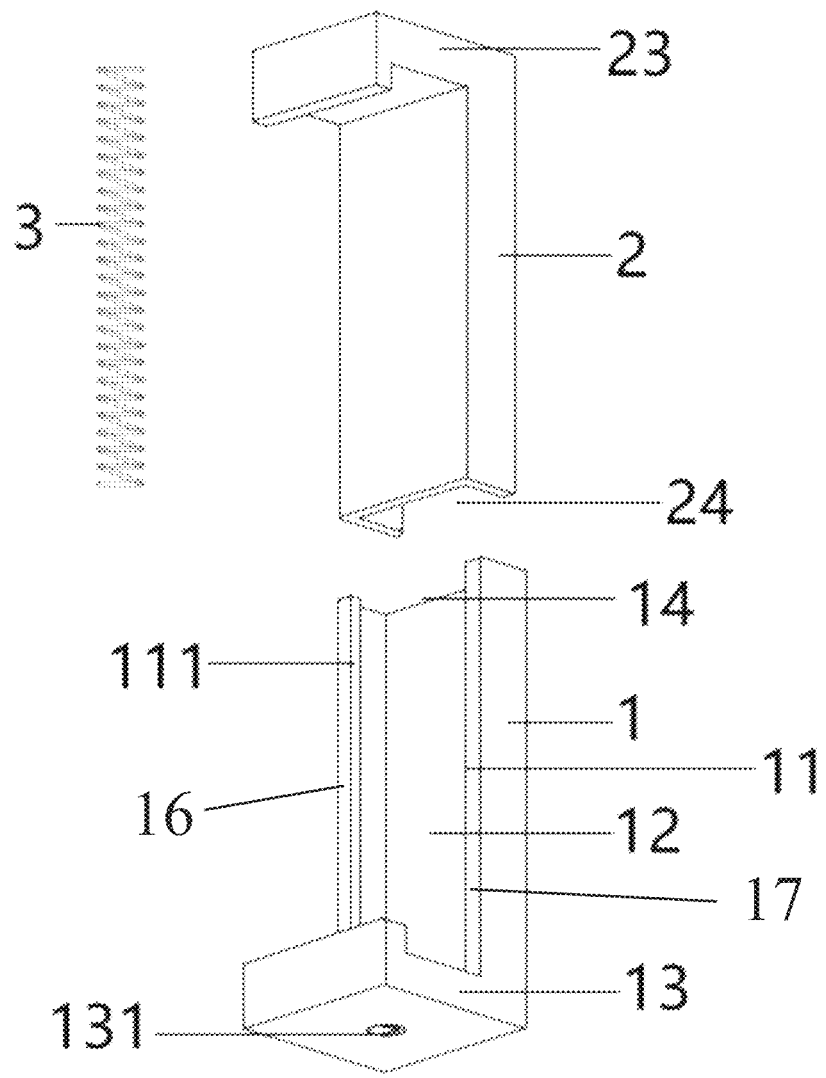
FIG. 1A is a first schematic exploded perspective view of a first embodiment of the present invention.
Figure 1B:
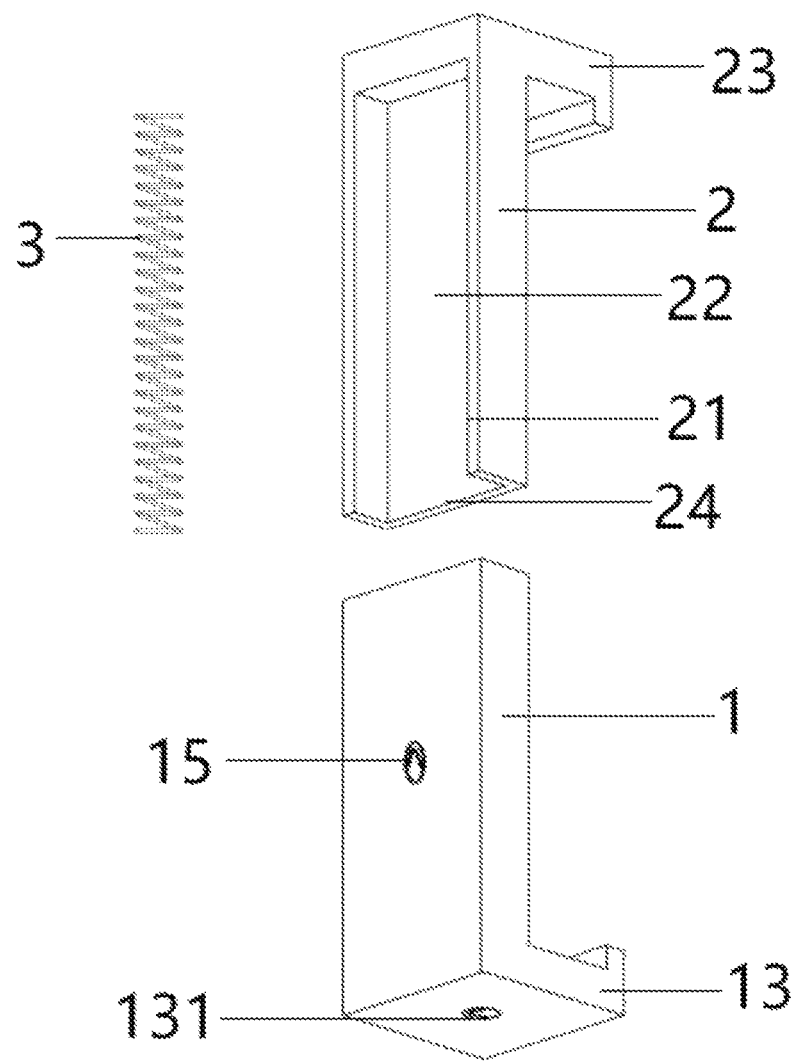
FIG. 1B is a second schematic exploded perspective view of the first embodiment of the present invention.
Figure 1C:
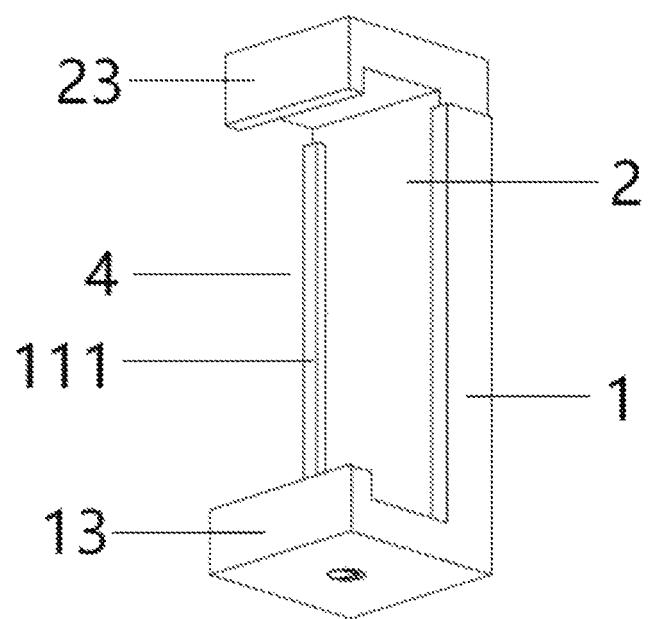
FIG. 1C is a schematic assembled perspective view of the first embodiment of the present invention.
Figure 1D:
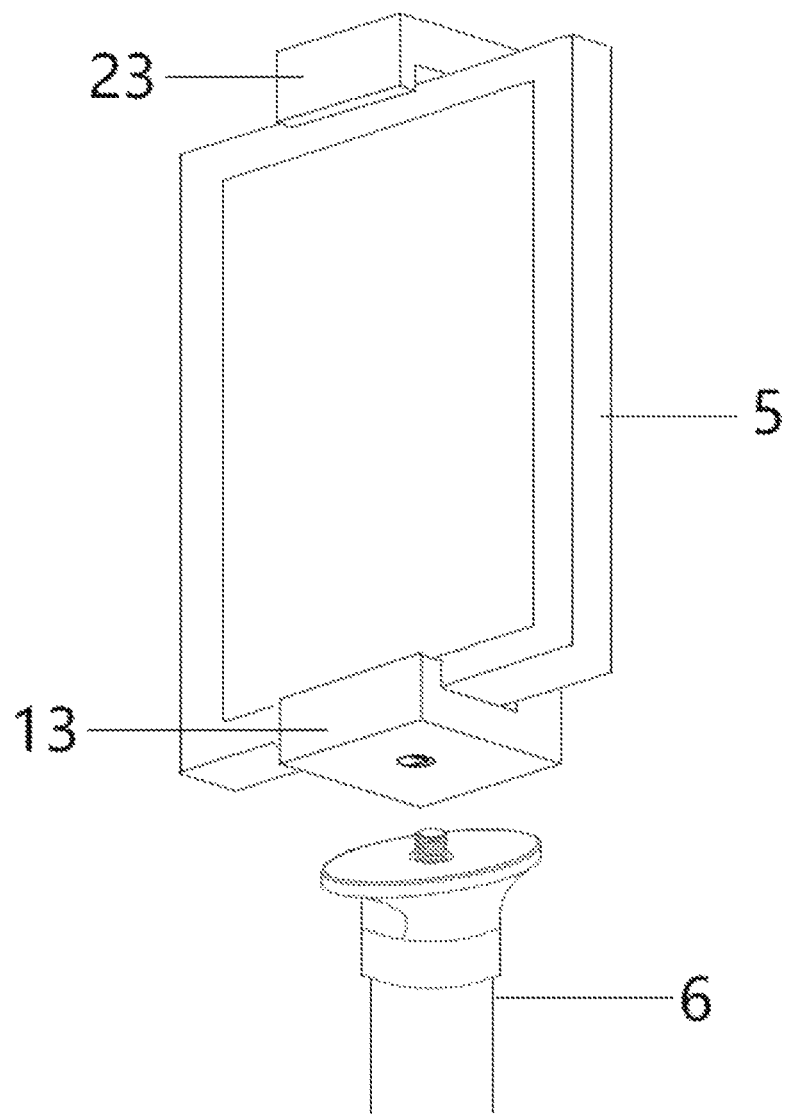
FIG. 1D is a schematic perspective view showing a tablet clamped on the first embodiment of the present invention.

With reference to FIGS. 1A to 1E, a tablet holder for clamping a tablet 5 according to a first embodiment of the present invention comprises: a first U-groove coupling part 1, a second U-groove coupling part 2, and a positioning member 3. As shown in FIGS. 1A and 1B, the first U-groove coupling part 1 is longitudinally provided with a first opening 11 between a first sidewall 16 and a second sidewall 17. Both sides of the first opening 11 are each inwardly provided with a corresponding blocking portion 111 at a predetermined position to cover a portion of the first opening 11, and the two corresponding blocking portions 111 are respectively extended inwardly from the first sidewall 16 and the second sidewall 17. An inwardly recessed portion of the first U-groove coupling part 1 is a first accommodating portion 12 communicated with the first opening 11. The first U-groove coupling part 1 is provided with a first clamping portion 13 at one end thereof and a first coupling opening 14 at another end thereof. The two blocking portions 111 respectively extend in a longitudinal direction along the first sidewall 16 and the second sidewall 17 from the first clamping portion 13 to the first coupling opening 14. The second U-groove coupling part 2 is longitudinally provided with a second opening 21. An inwardly recessed portion of the second U-groove coupling part 2 is a second accommodating portion 22 communicated with the second opening 21. The second U-groove coupling part 2 is provided with a second clamping portion 23 at one end thereof and a second coupling opening 24 at another end thereof. In assembling, the first clamping portion 13 is placed correspondingly to the second clamping portion 23, and the second coupling opening 24 penetrates into the first coupling opening 14. As shown in FIG. 1C, the second U-groove coupling part 2 is restricted by the blocking portions 111 and prevented from escaping out of the first opening 11 in a transverse direction perpendicular to the longitudinal direction, in such a way that the first U-groove coupling part 1 and the second U-groove coupling part 2 are fitted with each other, and a clamping space 4 is formed between the first clamping portion 13 and the second clamping portion 23. As shown in FIG. 1D, the tablet 5 is placed in the clamping space 4, and the second U-groove coupling part 2 and the first U-groove coupling part 1 can slide longitudinally with respect to each other, thereby holding the tablet 5 in the clamping space 4 by an action of the positioning member 3. In this embodiment, the positioning member 3 may be a compression spring or other implementations.

Figure 1E:
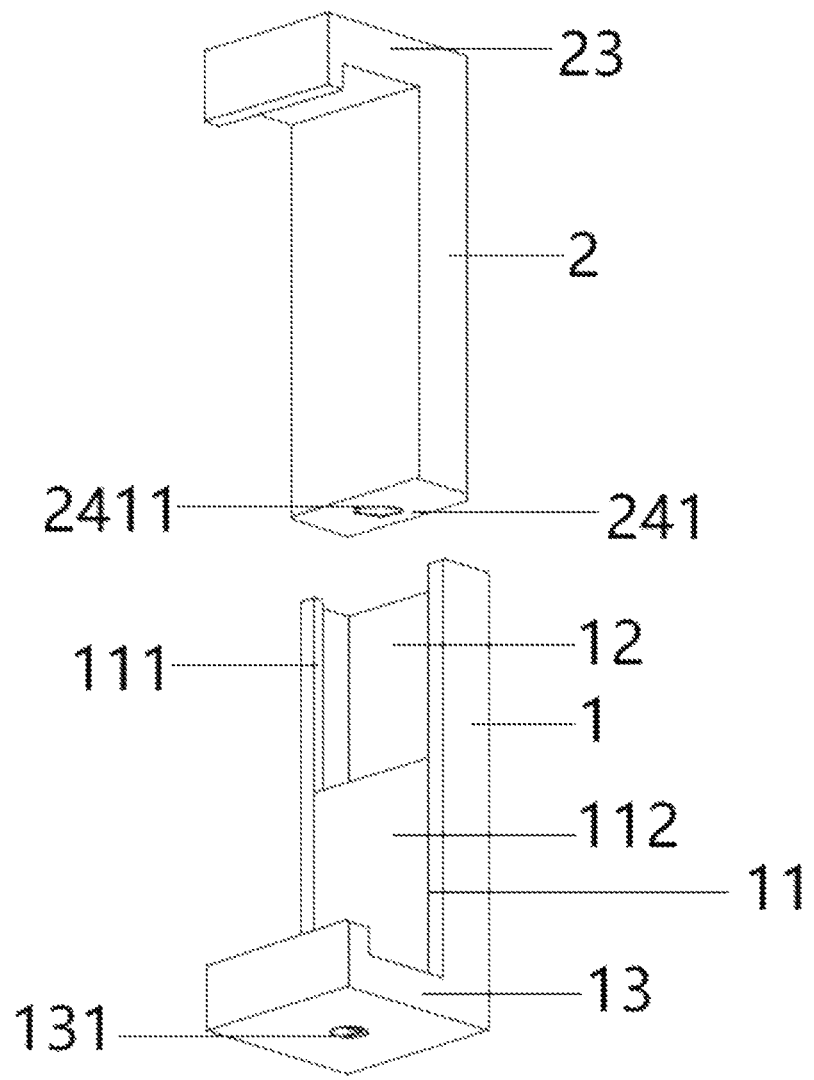
FIG. 1E is a schematic perspective view of the first embodiment of the present invention, which further comprises a baffle and a supporting wall.

As shown in FIG. 1E, in the tablet holder of the first embodiment of the present invention, a baffle 112 is provided at the first opening 11. The baffle 112 can increase the strength of the first U-groove coupling part 1.

As shown in FIG. 1E, in the tablet holder of the first embodiment of the present invention, a supporting wall 241 is provided at the second coupling opening 24. The supporting wall 241 makes the second opening 21 of the second U-groove coupling part 2 maintain a stable shape. The supporting wall 241 is provided with a positioning member hole 2411, and the movement of the positioning member 3 will not be restricted by the supporting wall 241.

As shown in FIGS. 1B and 1D, in the tablet holder of the first embodiment of the present invention, the first clamping portion 13 is provided with a first fastener 131 that can be coupled with a stand 6. In addition, the first U-groove coupling part 1 is provided with a second fastener 15, which can also be coupled with the stand 6, at an outer side of a U-shaped bottom thereof.

Figure 2A:
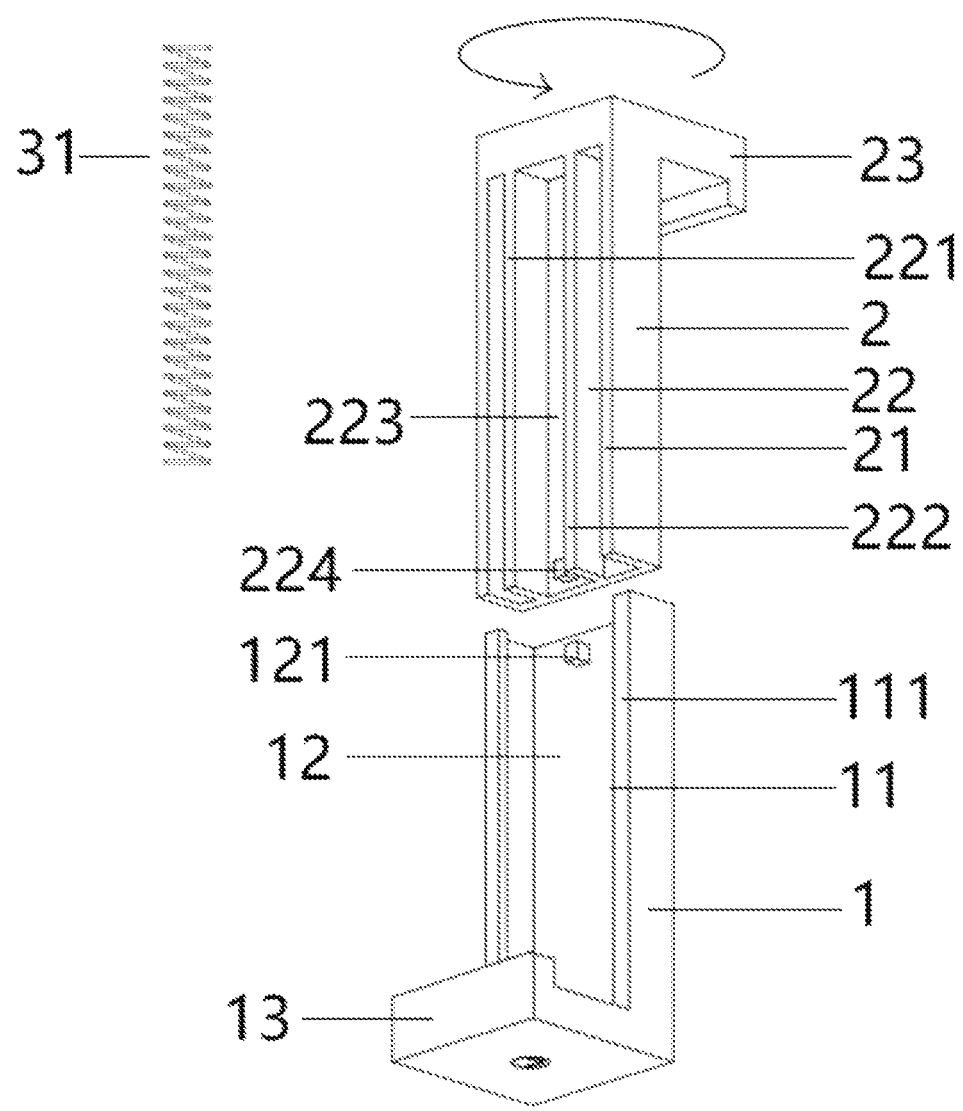
FIG. 2A is a schematic exploded perspective view of a second embodiment of the present invention.
Figure 2B:
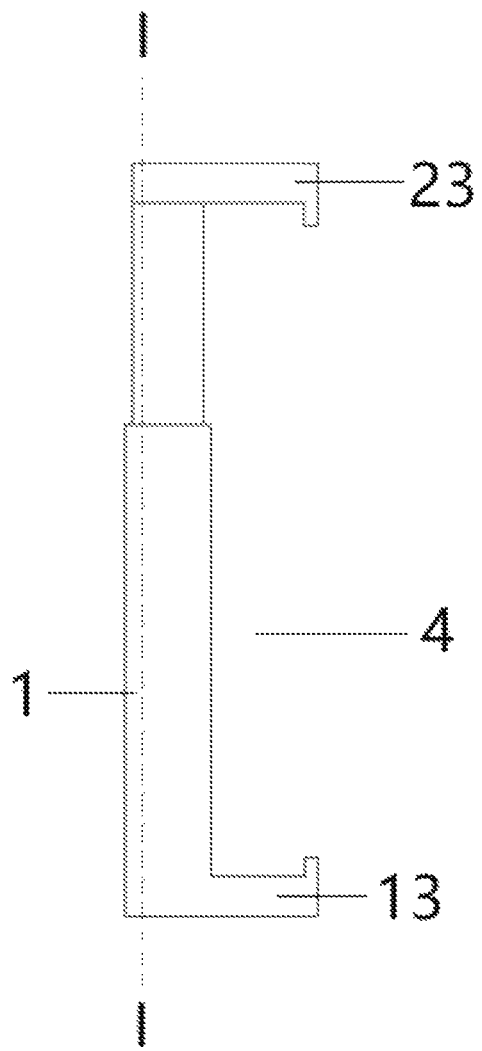
FIG. 2B is a schematic assembled side view of the second embodiment of the present invention.
Figure 2C:
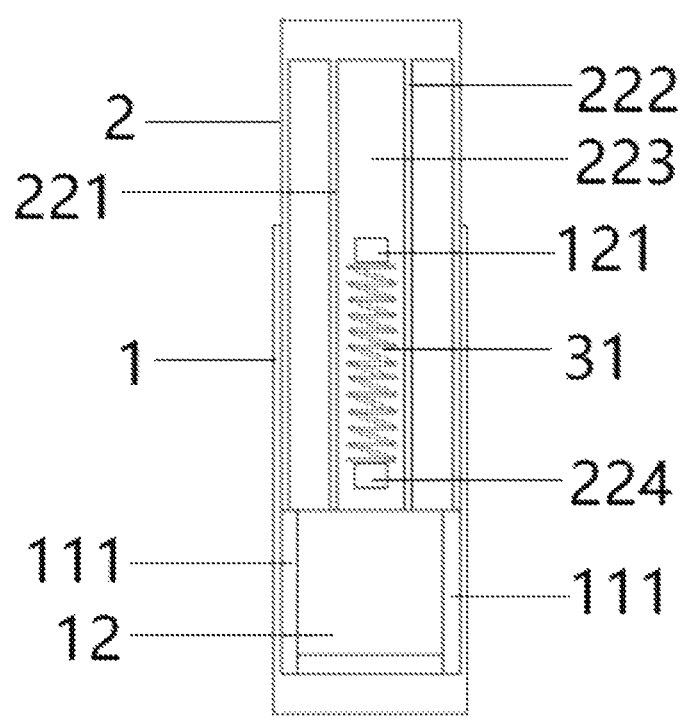
FIG. 2C is a schematic cross-section view of the second embodiment of the present invention taken along line I-I of FIG. 2B.

Refer to FIGS. 2A to 2C, which show a tablet holder of a second embodiment of the present invention. As shown in FIG. 2A, the positioning member 3 is a first spring 31. The second accommodating portion 22 is longitudinally provided with a first spring wall 221 and a second spring wall 222. A first spring groove 223 is formed between the first spring wall 221 and the second spring wall 222. A first limit stop 121 is provided at a predetermined position of the first coupling opening 14 of the first U-groove coupling part 1. A second limit stop 224 is provided at a predetermined position of the second coupling opening 24 of the second U-groove coupling part 2. The first limit stop 121 and the second limit stop 224 are provided at both ends of the first spring groove 223, respectively. The first U-groove coupling part 1 and the second U-groove coupling part 2 are coupled with each other. As shown in FIGS. 2B and 2C, the first spring 31 is placed into the first spring groove 223, and both ends of the first spring 31 abut against the first limit stop 121 and the second limit stop 224, respectively. In operating, the clamping space 4 is adjusted to be larger, the tablet 5 is placed therein, and then the first spring 31 abuts against the first limit stop 121 and the second limit stop 224, such that the first clamping portion 13 and the second clamping portion 23 are close to each other to clamp the tablet 5.

Figure 3A:
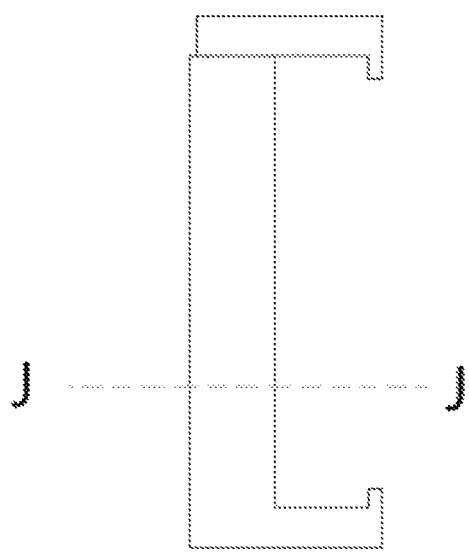
FIG. 3A is a schematic assembled side view of a third embodiment of the present invention.
Figure 3B:
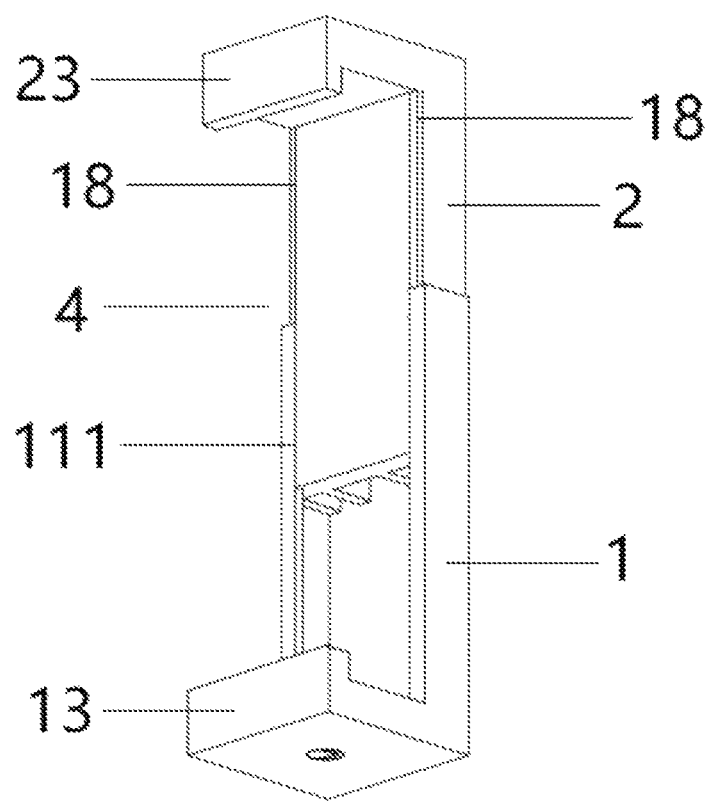
FIG. 3B is a schematic assembled perspective view of the third embodiment of the present invention.
Figure 3C:
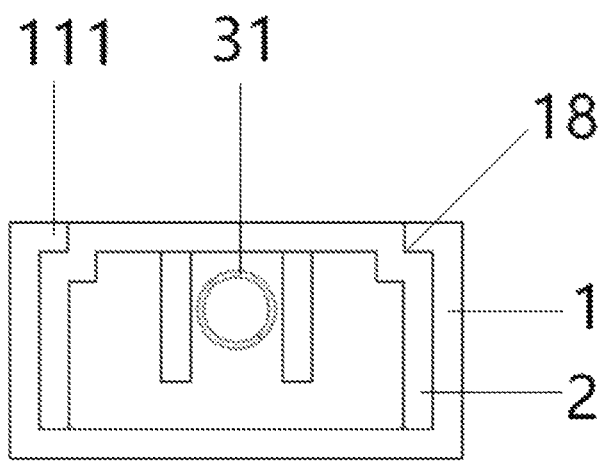
FIG. 3C is a schematic cross-section view of the third embodiment of the present invention taken along line J-J of FIG. 3A.

Refer to FIGS. 3A to 3C, which show a tablet holder of a third embodiment of the present invention. The second U-groove coupling part 2 is provided with two corner grooves 18 fitted with the blocking portions 111, such that the first opening 11 is filled and leveled up by the second U-groove coupling part 2. In this embodiment, the contact area between the tablet 5 and the tablet holder can be increased.

Figure 4A:
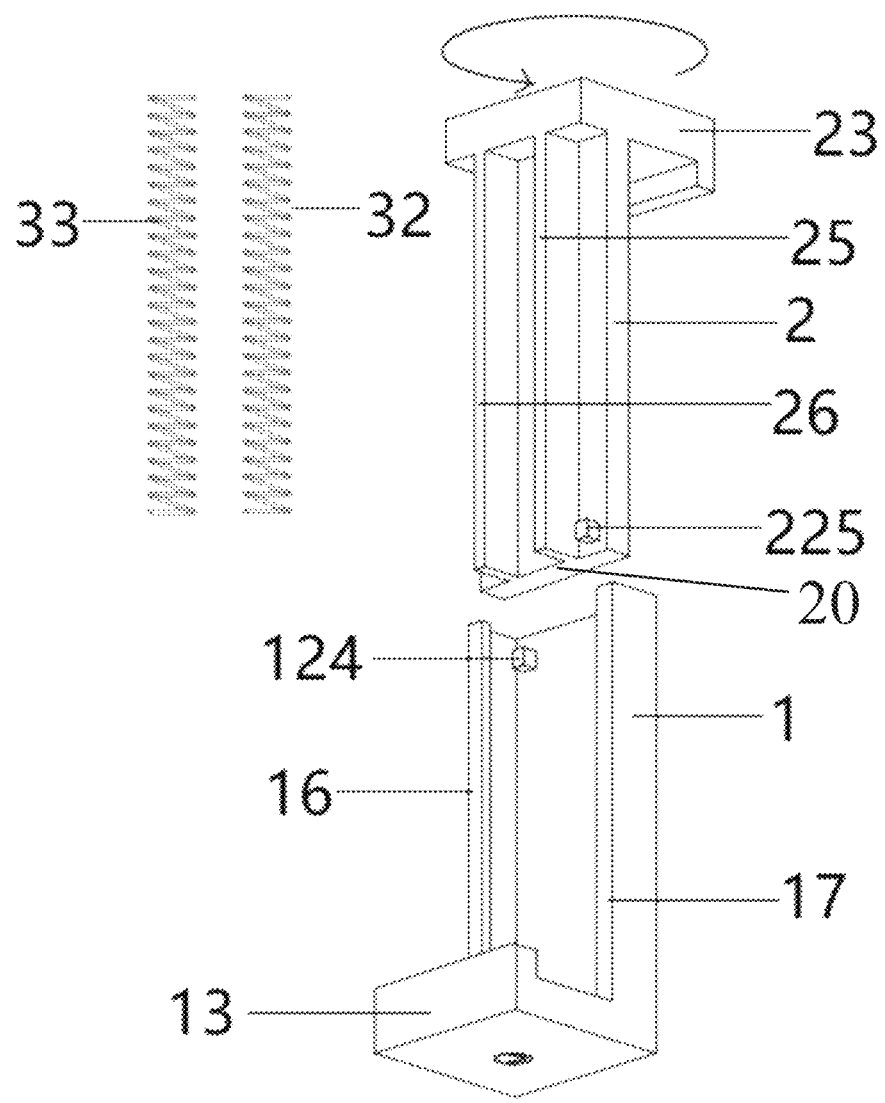
FIG. 4A is a schematic exploded perspective view of a fourth embodiment of the present invention.
Figure 4B:
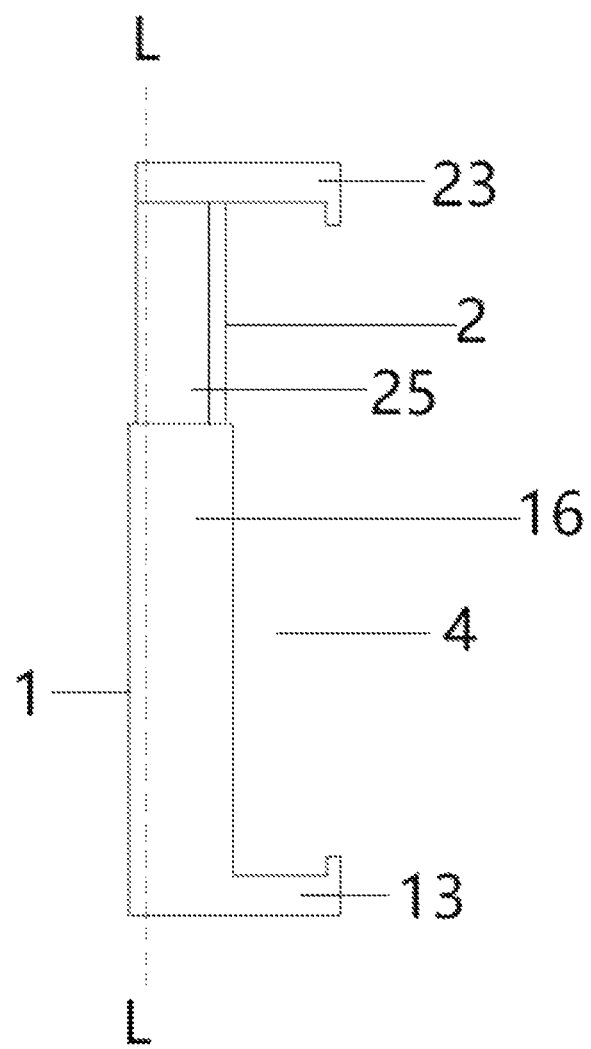
FIG. 4B is a schematic assembled side view of the fourth embodiment of the present invention after assembly.
Figure 4C:
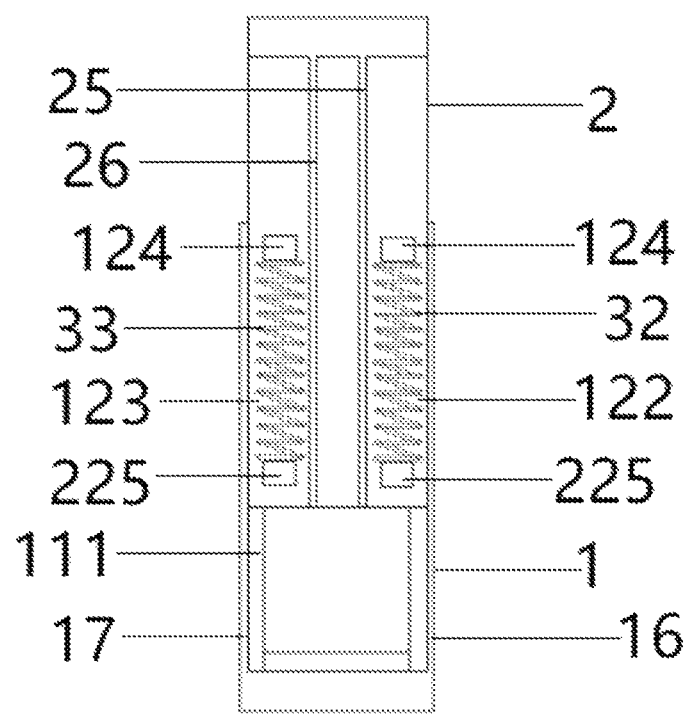
FIG. 4C is a schematic cross-section view of the fourth embodiment of the present invention taken along line L-L of FIG. 4B.
Figure 4D:
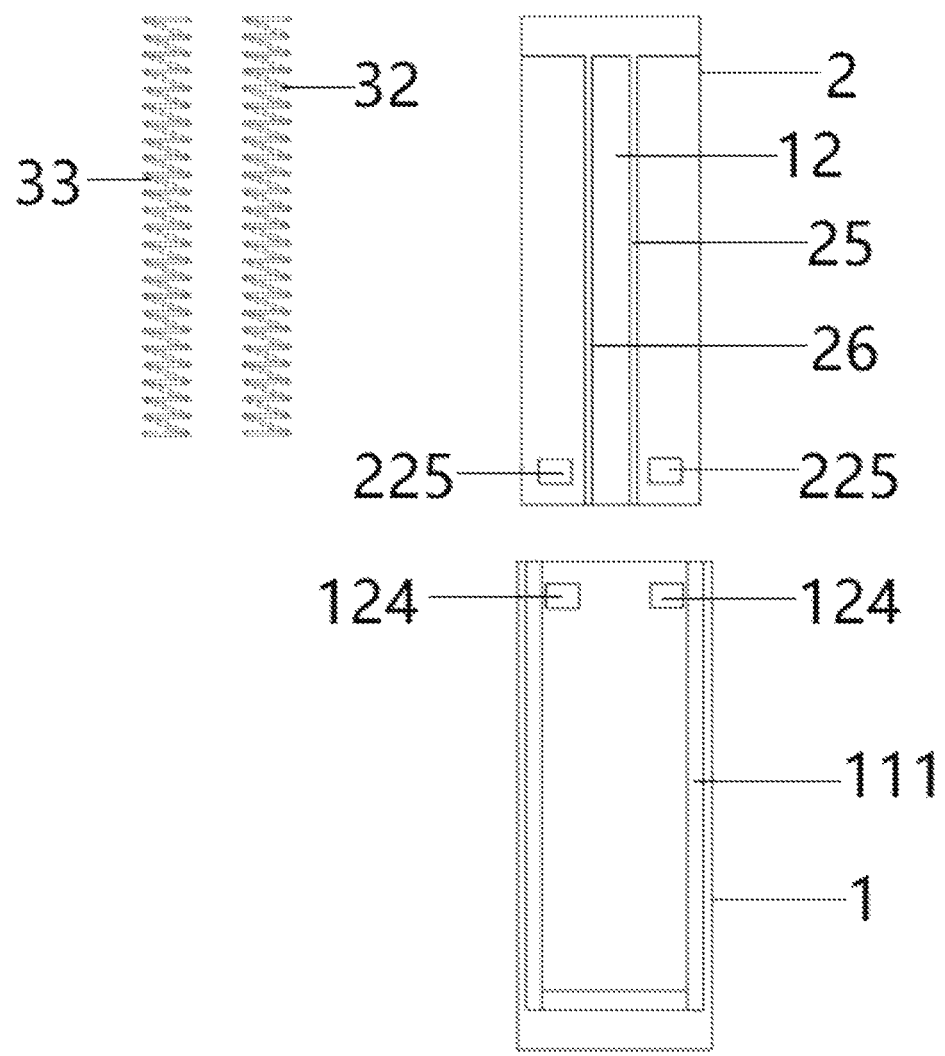
FIG. 4D is a schematic exploded cross-section view of the fourth embodiment of the present invention taken along the line L-L of FIG. 4B.

Refer to FIGS. 4A to 4D, which show a tablet holder of a fourth embodiment of the present invention. As shown in FIGS. 4A and 4D, two sides of the first U-groove coupling part 1 adjacent to the first opening 11 are defined as a first sidewall 16 and a second sidewall 17, respectively, and the second U-groove coupling part 2 adjacent to the second opening 21 includes a base plate 20, a third sidewall 25 and a fourth sidewall 26, respectively. The positioning member 3 includes a second spring 32 and a third spring 33. The third sidewall 25 and the fourth sidewall 26 are respectively positioned on the base plate 20 away from two longitudinal sides of the base plate 20. In assembling, the first clamping portion 13 is placed correspondingly to the second clamping portion 23, and the second coupling opening 24 penetrates into the first coupling opening 14. As shown in FIGS. 4B and 4C, a second spring groove 122 is formed between the first sidewall 16 and the third sidewall 25, and a third spring groove 123 is formed between the second sidewall 17 and the fourth sidewall 26. Two third limit stops 124 are provided at predetermined positions of the first coupling opening 14. Two fourth limit stops 225 are provided at predetermined positions of the second coupling opening 24. The third limit stops 124 and the fourth limit stops 225 are disposed at both ends of the second spring groove 122 and the third spring groove 123, respectively. The second spring 32 and the third spring 33 are placed into the second spring groove 122 and the third spring groove 123, respectively, and both ends of the second spring 32 and the third spring 33 abut against the third limit stops 124 and the fourth limit stops 225, respectively. In operating, the clamping space 4 is adjusted to be larger, the tablet 5 is placed therein, and then the second spring 32 and the third spring 33 abut against the third limit stops 124 and the fourth limit stops 225, such that the first clamping portion 13 and the second clamping portion 23 are close to each other to clamp the tablet 5. In this embodiment, it can be allowed to merely use any one of the positioning members 3. However, the clamping effect of the first clamping portion 13 and the second clamping portion 23 can be increased when both of the positioning members 3 are used simultaneously.

Preferably, refer to FIGS. 5A to 6D, which show tablet holders of fifth and sixth embodiments of the present invention. The positioning member 3 is a first screw stud 34, the second clamping portion 23 is provided with a through hole 231, and the through hole 231 extends longitudinally inwardly from an outside of the second clamping portion 23 to the second accommodating portion 22.

Figure 5A:
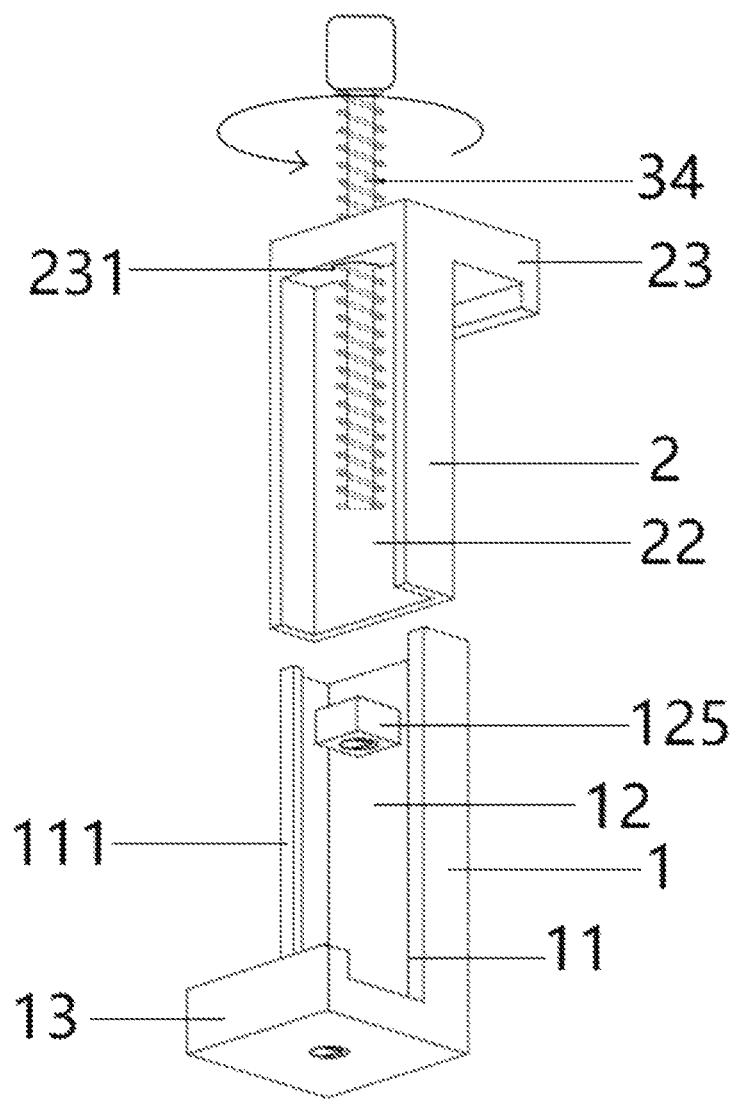
FIG. 5A is a schematic exploded perspective view of a fifth embodiment of the present invention.
Figure 5B:
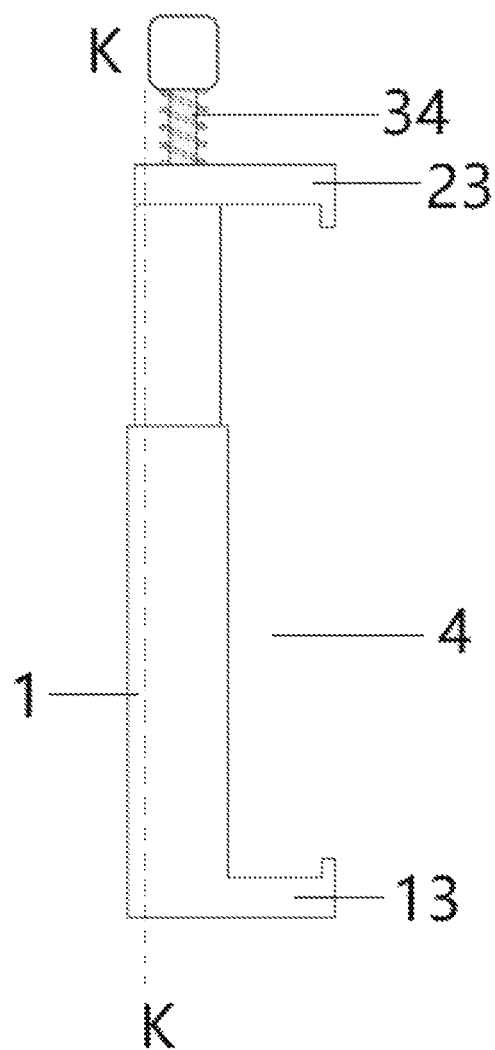
FIG. 5B is a schematic assembled side view of the fifth embodiment of the present invention.
Figure 5C:
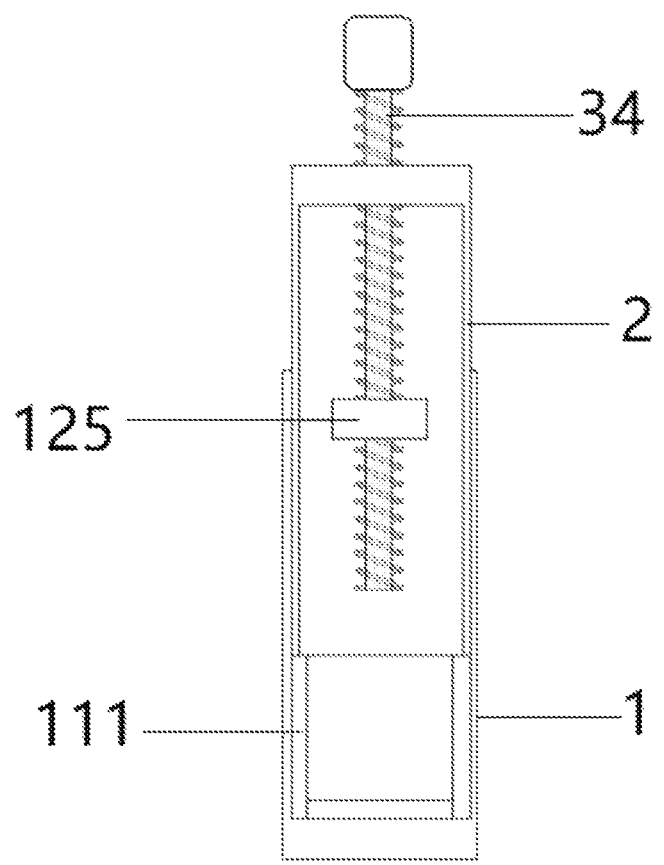
FIG. 5C is a schematic cross-section view of the fifth embodiment of the present invention taken along line K-K of FIG. 5B.

As shown in FIGS. 5A to 5C, in the tablet holder of the fifth embodiment of the present invention, the first accommodating portion 12 is provided with a first nut 125 at a predetermined position close to the first coupling opening 14. The first screw stud 34 penetrates through the through hole 231 and the first nut 125, whereby a size of the clamping space 4 can be adjusted by a releasing and a locking between the first screw stud 34 and the first nut 125. In this embodiment, the clamping effect is quite good and will not become worse over time. However, when the clamping space 4 needs to be adjusted by a larger distance, it will be time-consuming.

Figure 6A:
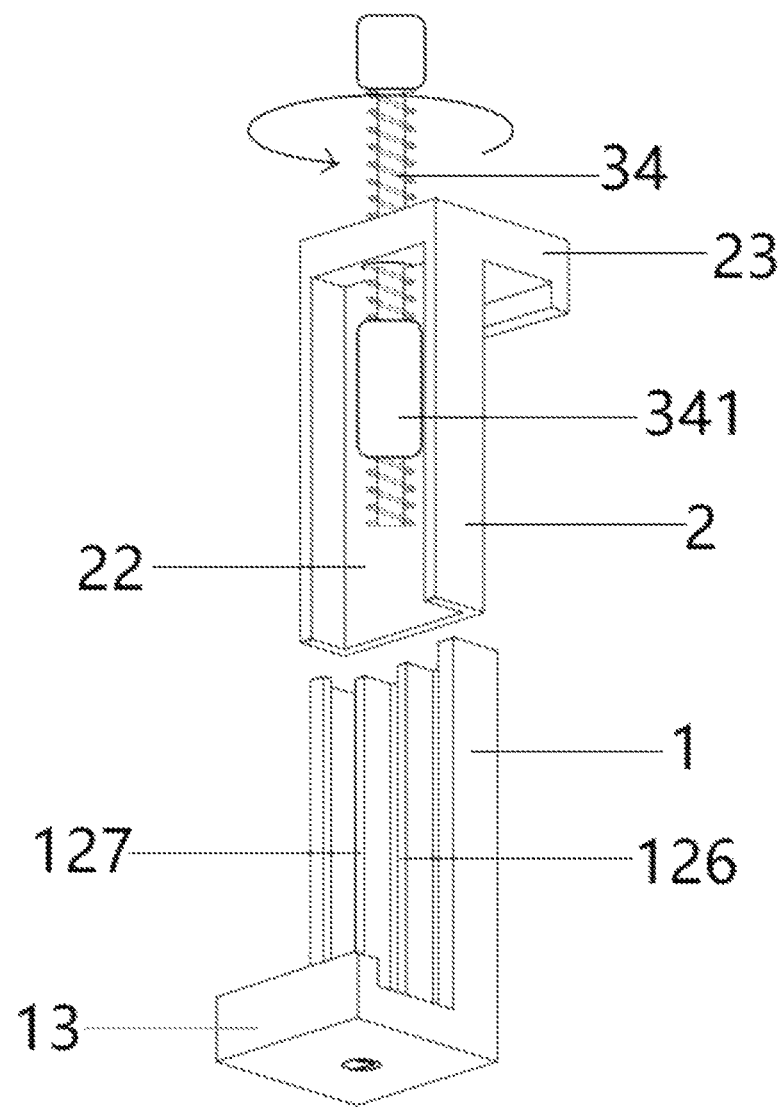
FIG. 6A is a schematic exploded perspective view of a sixth embodiment of the present invention.
Figure 6B:
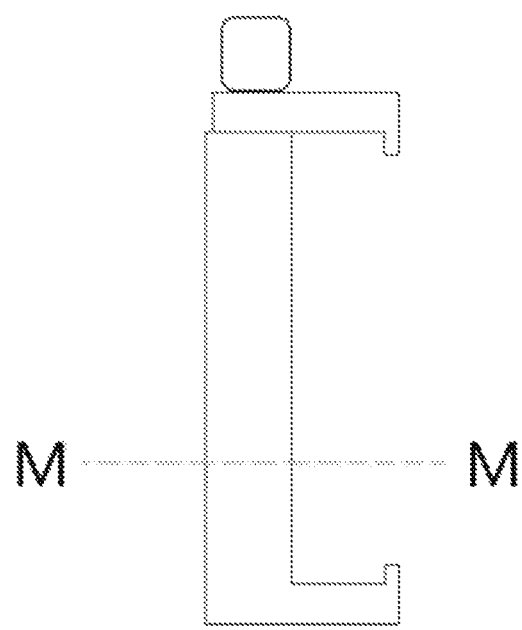
FIG. 6B is a schematic assembled side view of the sixth embodiment of the present invention.
Figure 6C:
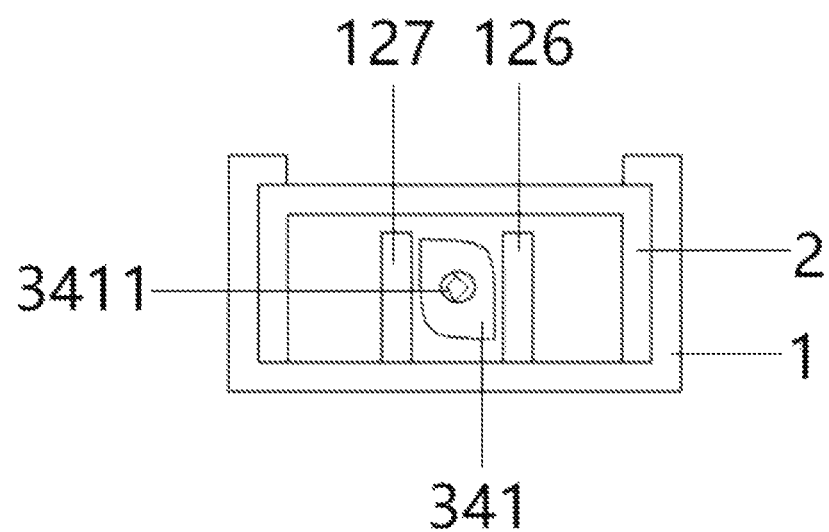
FIG. 6C is a schematic cross-section view of the sixth embodiment of the present invention taken along line M-M of FIG. 6B in a released state.
Figure 6D:
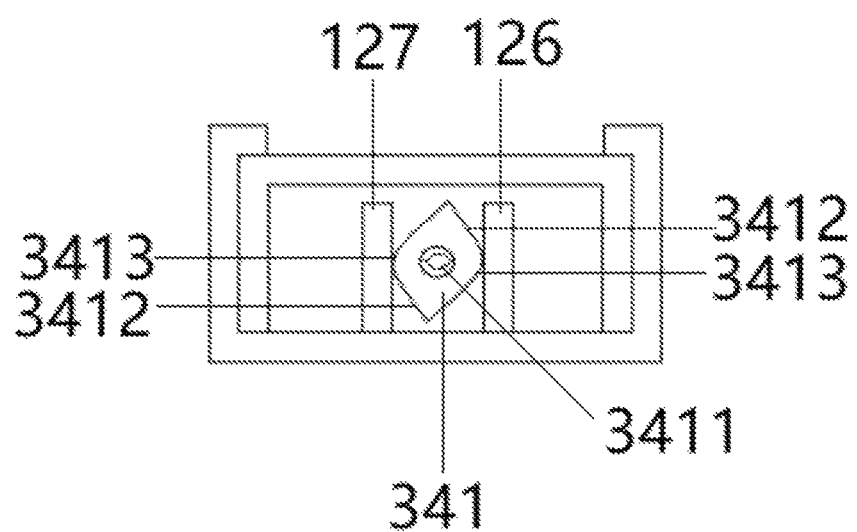
FIG. 6D is a schematic cross-section view of the sixth embodiment of the present invention taken along the line M-M of FIG. 6B in a locked state.

As shown in FIGS. 6A to 6D, in the tablet holder of the sixth embodiment of the present invention, the first accommodating portion 12 is longitudinally provided with a fifth sidewall 126 and a sixth sidewall 127, and a movable fastening member 341 is provided on the first screw stud 34. A second nut 3411 is provided at a center of the movable fastening member 341. One set of opposite sides of the movable fastening member 341 are two partially corresponding parallel walls 3412, and another set of opposite sides thereof are two corresponding arc walls 3413. The clamping space 4 is adjusted to an appropriate size, as shown in FIGS. 6B and 6D, the first screw stud 34 is rotated in a locking direction, such that the arc walls 3413 of the movable fastening member 341 abut against the fifth sidewall 126 and the sixth sidewall 127, respectively, whereby the movable fastening member 341 remains stationary, and the first screw stud 34 and the second nut 3411 can be locked to each other. As shown in FIG. 6C, the first screw stud 34 is rotated in a releasing direction, and the parallel walls 3412 of the movable fastening member 341 can slide with respect to the fifth sidewall 126 and the sixth sidewall 127, respectively. In this embodiment, it can be allowed to quickly adjust the clamping space 4 to an appropriate size, and then perform the locking or releasing action, without consuming too much time to rotate the screw stud.

Figure 7:
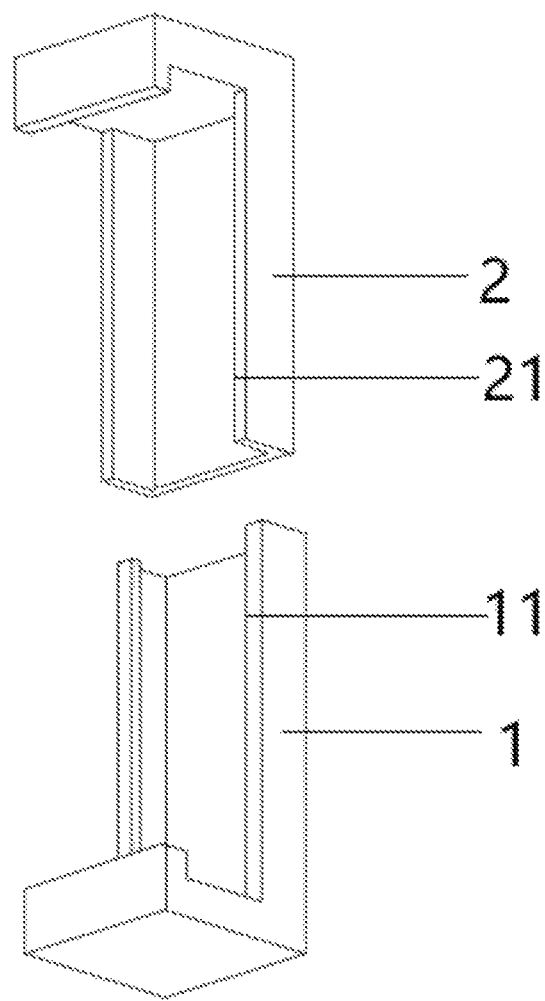
FIG. 7 is a schematic exploded perspective view of a seventh embodiment of the present invention.

Refer to FIG. 7, which shows a tablet holder of a seventh embodiment of the present invention. The first opening 11 of the first U-groove coupling part 1 and the second opening 21 of the second U-groove coupling part 2 face toward a same direction when both are coupled with each other. This embodiment of the present invention provides another choice on the direction toward which the first opening 11 and the second opening 21 face according to the user's needs.

Figure 8:
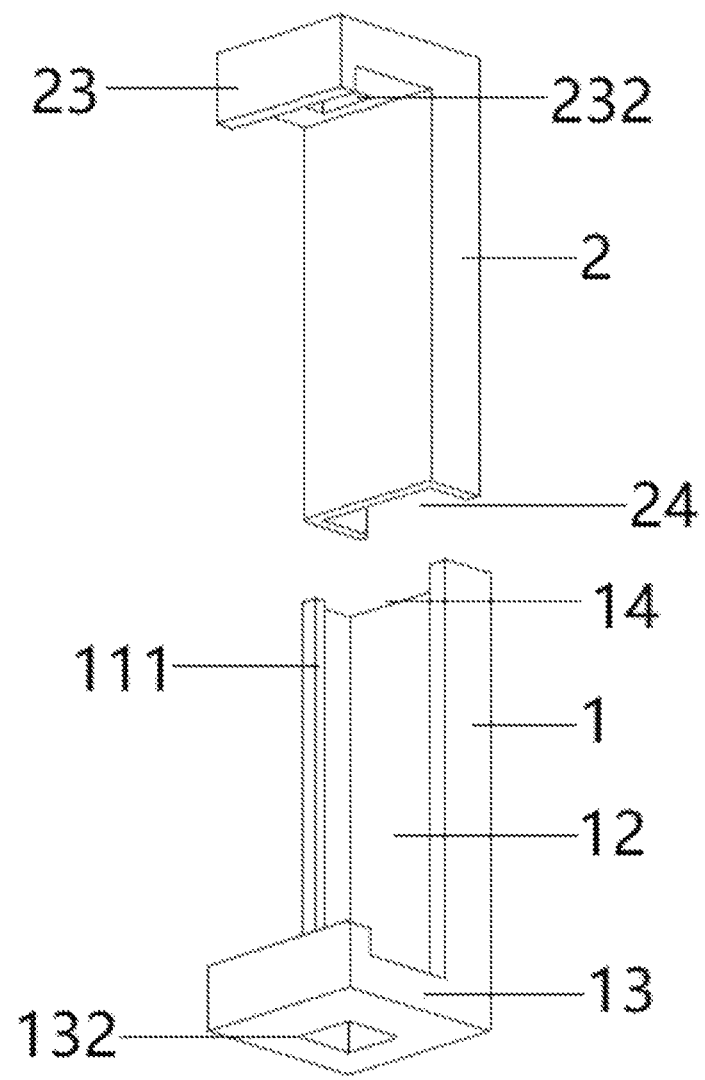
FIG. 8 is a schematic exploded perspective view of an eighth embodiment of the present invention.

Refer to FIG. 8, which shows a tablet holder of an eighth embodiment of the present invention. The first clamping portion 13 and the second clamping portion 23 are respectively provided with a first clamping portion hole 132 and a second clamping portion hole 232. Two across corners of the tablet 5 can be placed into the first clamping portion hole 132 and the second clamping portion hole 232, respectively. This embodiment of the present invention provides a solution of a special use state, such as a larger vibration state.

The above description and explanation are only explanations of the preferred embodiments of the present invention. Those skilled in the art can make other modifications based on the scope defined by claims and based on the above description, but these modifications should not departure from the invention spirit of the present invention and should be included in the claimed scope of the present invention.

What is claimed is:

1. A tablet holder for clamping a tablet, comprising:
   a first U-groove coupling part longitudinally provided with a first opening, wherein both sides of the first opening are inwardly provided with a corresponding blocking portion at a predetermined position, respectively, an inwardly recessed portion of the first U-groove coupling part is a first accommodating portion communicated with the first opening, the first U-groove coupling part is provided with a first clamping portion at one end thereof and a first coupling opening at another end thereof, the corresponding blocking portion extends in a longitudinal direction along one side of the first opening from the first clamping portion to the first coupling opening and the two corresponding blocking portions are respectively extended inwardly from a first sidewall and a second sidewall of the first U-groove coupling part to cover portions of the first opening;
   a second U-groove coupling part longitudinally provided with a second opening, wherein an inwardly recessed portion of the second U-groove coupling part is a second accommodating portion communicated with the second opening, the second U-groove coupling part is provided with a second clamping portion at one end thereof and a second coupling opening at another end thereof; and
   a positioning member,
   wherein in assembling, the first clamping portion is placed correspondingly to the second clamping portion, the second coupling opening penetrates into the first coupling opening, the second U-groove coupling part is restricted by the blocking portions and prevented from escaping out of the first opening in a transverse direction perpendicular to the longitudinal direction, in such a way that the first U-groove coupling part and the second U-groove coupling part are fitted with each other, a clamping space is formed between the first clamping portion and the second clamping portion, and thus the tablet can be placed in the clamping space, and the second U-groove coupling part and the first U-groove coupling part can slide longitudinally with respect to each other, thereby holding the tablet in the clamping space by an action of the positioning member.

2. The tablet holder according to claim 1, wherein the positioning member is a first spring, the second accommodating portion is longitudinally provided with a first spring wall and a second spring wall, a first spring groove is formed between the first spring wall and the second spring wall, a first limit stop is provided at a predetermined position of the first coupling opening of the first U-groove coupling part, a second limit stop is provided at a predetermined position of the second coupling opening of the second U-groove coupling part, the first limit stop and the second limit stop are provided at both ends of the first spring groove, respectively; the first spring is placed into the first spring groove, and both ends of the first spring abut against the first limit stop and the second limit stop, respectively; in operating, the clamping space is adjusted to be larger, the tablet is placed therein, and then the first spring abuts against the first limit stop and the second limit stop, such that the first clamping portion and the second clamping portion are close to each other to clamp the tablet.

3. The tablet holder according to claim 1, wherein the positioning member is a first screw stud, the second clamping portion is provided with a through hole, and the through hole extends longitudinally inwardly from an outside of the second clamping portion to the second accommodating portion.

4. The tablet holder according to claim 3, wherein the first accommodating portion is provided with a first nut at a predetermined position close to the first coupling opening, and the first screw stud penetrates through the through hole and the first nut, whereby a size of the clamping space can be adjusted by a releasing and a locking between the first screw stud and the first nut.

5. The tablet holder according to claim 3, wherein the first accommodating portion is longitudinally provided with a fifth sidewall and a sixth sidewall, a movable fastening member is provided on the first screw stud, a second nut is provided at a center of the movable fastening member, one set of opposite sides of the movable fastening member are two partially corresponding parallel walls, and another set of opposite sides thereof are two corresponding arc walls; the clamping space is adjusted to a predetermined size; when the first screw stud is rotated in a locking direction, the arc walls of the movable fastening member abut against the fifth sidewall and the sixth sidewall, respectively, whereby the movable fastening member remains stationary, and the first screw stud and the second nut can be locked to each other; when the first screw stud is rotated in a releasing direction, the parallel walls of the movable fastening member can slide with respect to the fifth sidewall and the sixth sidewall, respectively.

6. A tablet holder for clamping a tablet, comprising:
   a first U-groove coupling part longitudinally provided with a first opening, wherein two sides of the first U-groove coupling part adjacent to the first opening are defined as a first sidewall and a second sidewall, both sides of the first opening are longitudinally inwardly provided with a corresponding blocking portion at a predetermined position, respectively, an inwardly recessed portion of the first U-groove coupling part is a first accommodating portion communicated with the first opening, the first U-groove coupling part is provided with a first clamping portion at one end thereof and a first coupling opening at another end thereof;

a second U-groove coupling part longitudinally provided with a second opening, wherein the second U-groove coupling part includes a base plate, and a third sidewall and a fourth sidewall respectively positioned on the base plate away from two longitudinal sides of the base plate, an inwardly recessed portion of the second U-groove coupling part is a second accommodating portion communicated with the second opening, the second U-groove coupling part is provided with a second clamping portion at one end thereof and a second coupling opening at another end thereof; and a positioning member including a first spring and a second spring, wherein in assembling, the first clamping portion is placed correspondingly to the second clamping portion, the second coupling opening penetrates into the first coupling opening, the second U-groove coupling part is restricted by the blocking portions, in such a way that the first U-groove coupling part and the second U-groove coupling part are fitted with each other, a clamping space is formed between the first clamping portion and the second clamping portion, a first spring groove is formed between the first sidewall and the third sidewall, a second spring groove is formed between the second sidewall and the fourth sidewall, two first limit stops are provided at predetermined positions of the first coupling opening, two second limit stops are provided at predetermined positions of the second coupling opening, the first limit stops and the second limit stops are disposed at both ends of the first spring groove and the second spring groove, respectively;

the first spring and the second spring are placed into the first spring groove and the second spring groove, respectively, and both ends of the first spring and the second spring abut against the first limit stops and the second limit stops, respectively; in operating, the clamping space is adjusted to be larger, the tablet is placed therein, and then the first spring and the second spring abut against the first limit stops and the second limit stops, such that the first clamping portion and the second clamping portion are close to each other to clamp the tablet, and thus the tablet can be placed in the clamping space, and the second U-groove coupling part and the first U-groove coupling part can slide longitudinally with respect to each other, thereby holding the tablet in the clamping space by an action of the positioning member.

* * * * *